May 6, 1958 A. P. PAGÈS 2,833,855

CODER FOR TRANSLATING AN INTELLIGENCE WAVE INTO CODED PULSES

Filed May 6, 1952 3 Sheets-Sheet 1

Inventor

Andre Paul Pages

By: Haseltine, Lake & Co.

Agents

INVENTOR
ANDRE PAUL PAGES
By:
Hazeltine, Lake & Co.
AGENTS

May 6, 1958 A. P. PAGÈS 2,833,855
CODER FOR TRANSLATING AN INTELLIGENCE
WAVE INTO CODED PULSES
Filed May 6, 1952 3 Sheets-Sheet 3

United States Patent Office 2,833,855

Patented May 6, 1958

2,833,855

CODER FOR TRANSLATING AN INTELLIGENCE WAVE INTO CODED PULSES

Andre Paul Pagès, Paris, France, assignor to Societe Alsacienne de Constructions Mecaniques, a corporation of France Application May 6, 1952, Serial No. 286,234

Claims priority, application France May 17, 1951

3 Claims. (Cl. 178—43.5)

Figure 1:
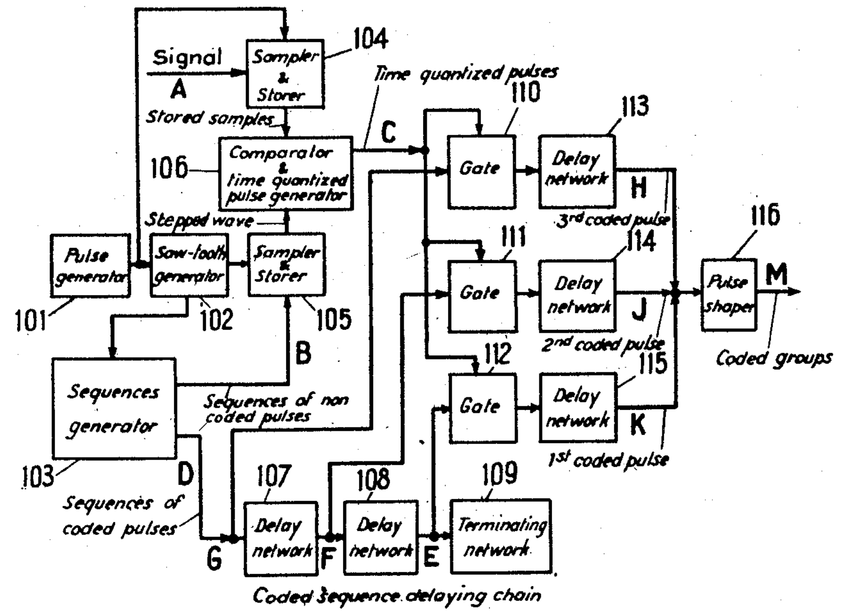

The present invention relates to systems for the transmission of an intelligence wave by means of coded electric pulses, and more particularly to a coding device translating said wave into pulses of one or the other of two possible signalling conditions.

It is known that in coding devices for such systems, the instantaneous amplitudes of the intelligence wave to be translated are sampled at periodic recurrent time intervals of recurrence period T, which may be equal, for instance, to $\frac{1}{8000}$ of one second when it is desired to transmit frequency bands corresponding to one telephone communication channel, and that there are made to correspond, to a finite number $2^n$ of different amplitudes of said wave, the $2^n$ permutation combinations which may be formed with groups of an integer number $n$ of electric pulses sent successively and capable of assuming one or the other of two possible signalling conditions. This number $n$ might be taken equal to 3 and although this number only gives 8 code combinations and is smaller than those used practically, it has been chosen hereinafter to facilitate the description of the invention and to simplify the drawings. As is well known, the chosen range of variation of the amplitude of the intelligence wave to be transmitted is divided into $2^n$ intervals, i. e. 8 in the case of the example assumed, and when a sampled amplitude is in one of these intervals, there is formed and sent through a suitable transmission medium a group of pulses corresponding, in accordance with the code chosen, to the interval containing the sampled amplitude.

The choice of the code, i. e. of the law of correspondence between the groups and the amplitudes, is arbitrary. In the present invention, a particular type of code is used which has already been described, as well as means for forming the corresponding pulse groups, in the U. S. Patent 2,646,548 filed on July 9, 1949, in the names of J. A. Ville, P. A. Herreng and A. P. Pages. The characteristics of this code will be briefly recalled hereinafter.

In accordance with a general convention, it is convenient to represent the two possible signalling conditions for one pulse by the binary digits "0" and "1." This representation is particularly figurative if the two signalling conditions for the pulses are their absence and their presence.

It will be assumed, hereinafter, for simplifying the description, that such are the conditions for the pulses used.

A sequence of $2^n+(n-1)$ pulses, i. e. of 10 pulses if $n=3$ as has been assumed by way of example, may be represented by a sequence of 10 binary figures, such as 0 1 0 0 0 1 1 1 0 1

This sequence represents what will be called hereinafter, a "sequence of coded pulses"; it is characterized by the fact that the 8 three-figure groups which may be derived from it by successively taking as a first digit each one of the figures which make up said sequence are different and represent, consequently, the 8 permutation groups which may be formed with three pulses. The 8 groups thus formed are represented by 010 100 000 001 011 111 110 101

The type of code used in the invention consists in dividing according to a known method the possible range of variation of the instantaneous amplitudes of the intelligence wave to be transmitted into a sequence of $2^n$ consecutive intervals, arranged in the order of increasing amplitudes or in the order of decreasing amplitudes (8 in the example chosen), in causing to correspond, to each one of these intervals, a particular group of pulses derived as explained from a sequence of coded pulses and having the same rank in said sequence as the interval in which the amplitude considered is located in said variation range and in forming and sending the pulse groups corresponding to the successive intervals in which are located the successive instantaneous amplitudes which have been sampled out of the signal wave to be translated. If, for instance, an amplitude is in the fourth interval, it will be represented by the pulse group "001," (i. e. two absent pulses followed by a present pulse).

Any telecommunication system of the above defined type comprises a double quantization. The first one is a time quantization and results from the well known sampling operation. It is effected by the sampling device. The second one results from the fact that, only $2^n$ permutation groups of $n$ pulses being available, $2^n$ amplitude indications only can be transmitted. It is, therefore, an amplitude quantization. When samples of regularly increasing amplitudes are applied to a coding device, it must generate the same group for a certain number of them, then, above a certain sample amplitude limit, a different group. When an amplitude very close to that limiting amplitude is applied to the coder, it may operate incorrectly and generate a wrong group unless special precautions are taken to obviate this difficulty.

According to one of its features, the coding device which is an object of the invention comprises an amplitude quantizing device by means of which, once every period T, the transmitting of a group combination of $n$ voltages, each one of which may have one or the other of two possible values, is controlled by a pulse which, in time, can occupy only one of $2^n$ possible positions, this position depending on the value of the sample of the intelligence wave stored during that period.

According to a characteristic feature of the present invention, there is provided, in a telecommunication system wherein an intelligence wave to be transmitted is sampled for its instantaneous amplitude at periodically recurring instants with a time period T and in which each sample amplitude is represented by a group of an integer number $n$ of coded electric pulses, each of which may be of one or of the other of two possible signalling conditions, $2^n$ different possible amplitudes being respectively represented by the $2^n$ possible different permutation groups of $n$ electric pulses of one or of the other of the said signalling conditions, a coding method comprising periodically sampling the said amplitude and translating it into a control pulse, occupying, within the said time period T, one of $2^n$ possible distinct time intervals, the position of each one of which corresponds to one different of the said 2n different possible amplitudes, periodically producing with the same said period T a sequence of $2^n+(n-1)$ voltage pulses so arranged as successively to reproduce once all $2^n$ possible permutation groups of $n$ coded voltage pulses of one or of the other of two predetermined voltage values, each one of the said $2^n$ different groups in the said sequence being such that its $(n-1)$ first pulses be identical with the last $(n-1)$ pulses of the immediately preceding group, and causing the group of $n$ coded pulses in the said sequence beginning at the instant when the said control pulse is produced to be transmitted and thereafter impressing the said group upon a working circuit.

According to another feature of the present invention, there is further provided a coding device for the embodiment of the method just explained, the said coding device comprising a main generator of periodic pulses of period T, a storer and sampler device controlled by the said generator for periodically sampling the said intelligence wave and storing the value of its sampled instantaneous amplitude in the form of an electric voltage, electron tube means controlled by pulses from said generator whereby a non-coded sequence of $2^n$ voltage pulses and a coded sequence of $2^n+(n-1)$ voltage pulses are respectively produced in fixed time relation in a first and in a second circuits during recurring time intervals at most equal to T the pulses in the said coded sequence being of one or of the other of the two above-said possible signalling conditions and being arranged in such an order that every one of the $2^n$ possible permutation groups of $n$ such pulses successively occurs in the said sequence, the $(n-1)$ first pulses of any one of the said $2^n$ groups being identical to the $(n-1)$ last pulses of the immediately preceding group, the first $2^n$ pulses of the said coded sequence being respectively synchronous with the first $2^n$ pulses of the said non-coded sequence, a stepped-wave generator controlled by the pulses of the said non-coded sequence and supplying a stepped wave whose successive voltage levels are in number $2^n$ and reproduce the $2^n$ different amplitudes of the said intelligence wave to be represented, a voltage comparator for comparing the level of the said stepped wave to the said stored amplitude of the said intelligence wave, a control pulse generator controlled by the said comparator and allowing a control pulse to be transmitted when the amplitude of the said stepped wave goes through the value of the said stored amplitude of the said intelligence wave, a chain of delay networks to the input end of which the above-said sequence of coded pulses from the above-said second circuit is applied and to the output end of which a non-reflective terminal impedance is connected, the said chain being provided with $n$ connection points so arranged along the said chain as to provide, between each of said points and the next one, for a delay time equal to the recurrence period of the individual pulses in the said sequences of non-coded and coded-pulses, and gate devices in number $n$ controlled by the said control pulse for causing the $n$ values of the $n$ voltages present at the said $n$ points to be transferred as $n$ voltage pulses to a common utilization circuit.

In accordance with still another feature of the invention, there is contemplated, in a special coding device for the putting in application of the above method, the use of an electronic tube of a particular model, allowing, under the control of a main generator of periodic pulses, the period of which is equal to the period of the samplings effected in the wave to be transmitted, the simultaneous production, during recurrent time intervals, of the two sequences of non-coded and coded pulses defined above. Although the use of a tube of said particular model is not strictly necessary for the putting into application of the method in accordance with the invention, this use constitutes one of its preferred types of embodiment. It is however possible for any person skilled in the art, to obtain the production of said sequences by other means, in particular by other types of electronic tubes. The sequence of coded pulses, for instance, could be obtained by means of a tube having an electronic beam rotating along a circular path, said beam being received on a target provided with suitably arranged apertures and solid portions. The sequence of non-coded pulses could be generated simultaneously by a second tube of a similar construction, except that the target would include a set of regularly spaced apertures. The same sequence of non-coded pulses could also be generated by a pulse frequency multiplier device controlled by a main pulse generator operating at the frequency of the samplings effected in the intelligence wave to be transmitted. There would be no technical difficulty for the man of the art, in synchronising the generation of two such sequences. It should, therefore, be clearly understood that the preferred type of embodiment described above in detail, utilizing an electronic tube of a type derived from that described in the U. S. Patent 2,646,548, already referred to, is not limitative as to the scope of the invention and that any other known electronic device could be used for the generation of said sequences of coded and non-coded pulses.

There has been described, in the above mentioned patent application, an electronic tube making it possible to form groups of pulses sampled out of a coded sequence. This tube comprises means for forming an electronic beam, a pair of deflecting electrodes for deflecting said beam in a single given direction, which will be assumed to be vertical, for instance, and a collecting electrode supplied by an outside voltage source. This tube comprises, further, on the path of the beam, between the deflecting electrodes and the collecting electrode, an electrode, called a mask electrode, apertured in such a manner that when the beam is deflected, upwards for instance, it meets $2^n$ elements on said electrode, elements which are respectively solid or apertured, in accordance with a distribution law corresponding to the chosen code. Thus, according to whether, in the above defined sequence of binary numbers representing the sequence of coded pulses from which the code combinations are sampled, the considered element corresponds to a digit "0" or "1," the mask electrode has an aperature or a solid portion. It is clear that when the beam is deflected upwards, for instance by the application to the deflecting electrodes of a linear portion of a periodic "saw-tooth" wave, there will be obtained on the collecting electrode, a series of coded pulses; the pulses are individually absent when the beam goes through an aperture and present when it is intercepted by the mask electrode and collected by said electrode, which may be connected to a suitable auxiliary voltage source.

According to certain arrangements for the embodiment of the invention, there is provided, in a coding device of the above defined type, an electron beam tube comprising means for generating a narrow electron beam, two deflecting electrodes capable of imparting to said beam, under the control of a saw tooth voltage generator and during each period T, a scanning motion in a given direction, a main collector electrode collecting electrons from said beam; in front of said collector electrode and on the path of the beam which it intercepts during part of its scanning motion, an auxiliary electrode forming a mask comprising along the line of passage of the beam during its scanning motion, $2^n+n-1$ successive elements, some of which are solid, the others provided with an aperture for allowing the beam to pass, said elements being arranged in such an order as to form $2^n$ different permutation groups of $n$ successive elements individually characterized by the presence or absence of an aperture; and finally, in front of the said electrode forming a mask, and also on the path of said beam which it also interrupts $2^n$ times during its scanning motion, an auxiliary collector electrode in the form of a grid and comprising $2^n$ solid elements collecting electrons, said elements being placed facing the boundaries of two elements of the electrode acting as a mask so as not to be in front of one of the apertures therein.

The main and auxiliary collector electrodes are connected respectively with two circuits in each one of which a voltage pulse is collected every time the electron beam reaches one of said electrodes.

The circuit connected with the main collector electrode receives a pulse each time the beam has passed through an aperture in the auxiliary electrode masking it. During each scanning motion of the beam, i. e. during each period T, there are collected, therefore, in said circuit, $2^n+n-1$ successive pulses, each one of them characterized by one or the other of two possible signalling conditions, one of said conditions being the effective presence of the pulse, and the other one its absence. The present pulses correspond to the elements cut out in the mask and the absent pulses to the solid elements. The above defined coded pulse sequence, therefore, is obtained in this manner.

The circuit collected with the auxiliary collector electrode collects as many pulses as this electrode comprises solid portions i. e. $2^n$. These pulses, obviously, are all present and constitute the non-coded pulse sequence.

The present invention will be better understood from the following description when read with reference to the appended drawings, wherein: Figure 1 is a block diagram illustrating a device for the embodiment of the invention while Figures 6*a* to 6*e* show, schematically, the shapes of the signal waves at several important points of Figure 1. Figures 2, 3, 4 and 5 show, schematically, by way of examples, particular types of embodiment of elements of the diagram of Figure 1.

According to the invention, which will be better understood by reference with the block diagram shown on Figure 1, a generator of periodically recurrent pulses 101 generates periodic pulses at the period T of sampling of the intelligence wave to be transmitted (for instance 1/8000 sec.). This generator delivers so-called controlling pulses which control a recurrent saw-toothed voltage wave generator 102 the output voltage of which is applied to a pulse sequence generator—said generator producing, during each period T a sequence of coded pulses and a sequence of uncoded pulses such as defined above. In the case of the example already used above, relating to a 3 digit code, the coded pulse sequence; contains $2^n+n-1$ i. e. 10 pulses, each one of which has one or the other of two signalling conditions and the uncoded pulse sequence contains $2^n$; or 8 pulses. The pulses in each sequence are separated by a constant time interval *t* and the two sequences are supplied synchronously by the generator, in the sense that the first pulses in the two sequences coincide in time and the same holds for pulses having the same rank in both sequences.

Figure 3:
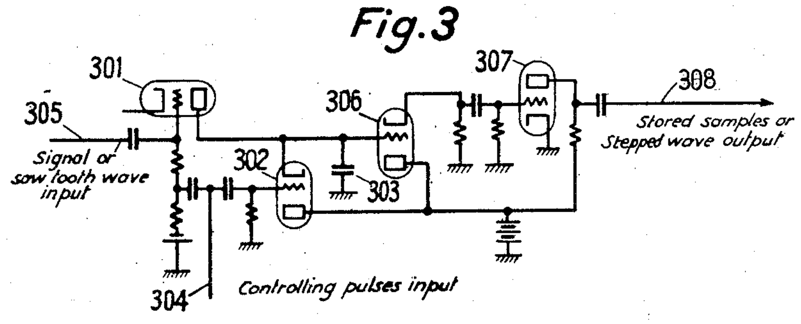

The intelligence wave to be translated is applied, at the point A, to a sampler and storer device 104 triggered by the controlling pulses with the period T and which may be of any known type, but an example of practical embodiment of which is shown on Figure 3. There is collected, periodically, at the output from 104, a voltage, the value of which is proportional to that of the sampled amplitude. This voltage will be called hereinafter a "stored sample." The already mentioned saw toothed wave is thus applied to a second sampler and storer device 105 which may be identical with 104, the operation of which is triggered by the pulses of the non-coded pulse sequence, from 103. There is thus collected periodically, at the output from 105 a stepped wave, the number of steps of which is equal to the number of pulses in the sequence, i. e. 8 in the above example.

Figure 2:
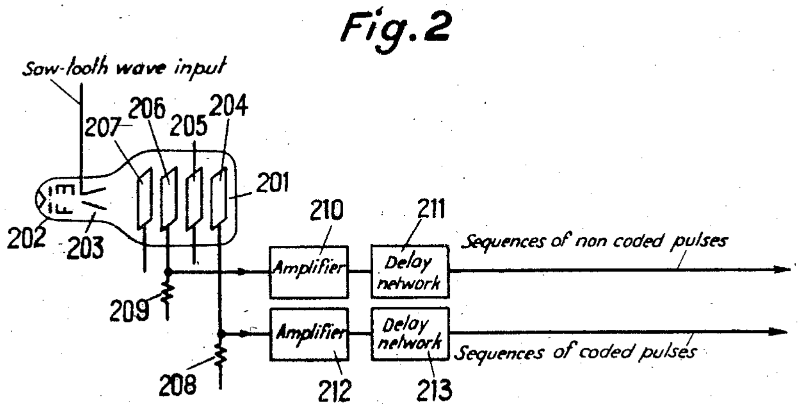

The voltage of the stored wave and that of the stepped wave are applied to an amplitude comparator 106 and one mode of embodiment of which is represented in greater detail in Figure 2 which generates a short pulse at the instant when the comparator evidences the equality of the two said voltages. It is clear that during each operation cycle of duration T corresponding to a sampling of the intelligence wave, the voltage of the stored wave remains constant, while that of the stepped wave varies in a discontinuous manner when passing from one step to the next one. The comparator will be thus actuated at the instant of one of these passages for each such cycle. A short pulse will thus be generated at the corresponding instant. The instants in question coinciding, on the other hand, with the instants of triggering of the sampler 105 by a pulse of the non-coded sequence, the short pulse generated will coincide with one of these pulses, the rank of said pulse in the sequence depending on the amplitude sampled: hence the designation of "time quantized" pulse given hereinafter to the pulse in question.

The coded pulse sequences issuing from 103 are applied to a chain of delay networks 107 and 108 terminated on a non-reflective impedance 109. The number of these networks is equal to the number *n* of the pulses in the groups, less one unit. The delay caused by each one of said networks has been taken equal to the time *t* which *t* separates two successive pulses in the sequence. During each operation cycle, a coded sequence goes through the chain and at the connection points E, F, G, of the delay networks with one another and with the sequence source and terminal network, the number of which points is equal to that of the pulses in a group, voltages appear which, for each pulse and at the instant when the peak of this pulse goes through the point considered, may assume one or the other of two different values, one of which may be zero, for instance. These voltages are applied to gate devices 110, 111 and 112, and one mode of embodiment of which is represented in greater detail in Figure 5, which are trigggered by the time quantized pulse, at an instant when the peaks of the coded pulses of the group corresponding to the sampled amplitude are just positioned at the above *a*, *b*, *c* points. These gates 110, 111, 112 supply respectively and simultaneously a pulse having one or the other of two possible signalling conditions, in accordance with the code combination to be sent. The pulses issuing from 110, 111, 112 are transferred to delay networks 113, 114 and 115 which step them in time at suitable and predetermined intervals defined by the spacing selected for the final transmission of the coded pulses inside one group. The group of coded pulses thus constituted is applied to a pulse shaper 116 which gives them a suitable wave shape for allowing them to be transmitted from the point M of Figure 1 to any transmission medium, such as a telecommunication cable circuit or a radioelectric relay.

Figure 2 shows diagrammatically one type of embodiment of the coded pulse sequence generator having reference numeral 103 in Figure 1. It comprises essentially a cathode ray tube of a type derived from that already described in the abovementioned United States Patent 2,646,548. 201 designates the tube itself, 202 the electron gun which generates the electron beam, 203 two deflecting electrodes, 204 the collecting electrode, 205 the mask electrode apertured in accordance with the law corresponding to the code selected and generating, when swept by the beam, the sequence of coded pulses. 206 designates a grid electrode, regularly apertured and generating by the sweeping by the beam the sequence of non-coded pulses. 207 designates an auxiliary collecting electrode which collects the secondary electrons, if any, emitted by the grid electrode. The power supply sources for the tube electrodes, which are not necessary for the understanding of the invention, have not been represented. 208 designates a resistance inserted in the circuit of the collecting electrode 204 and to the terminals of which may be collected the pulses of the coded sequence when the beam is deflected by a sawtooth voltage applied to the deflecting plates 203. 209 represents a resistance inserted in the circuit of the grid electrode 206 and at the terminals of which the pulses of the non-coded sequence may be collected. 210 and 212 represent amplifiers, 211 and 213 delay networks. During the application of each linear portion of the saw-tooth wave there are respectively collected at the terminals of 209 and 208 sequences of respectively non-coded and coded pulses, slightly shifted in time with respect to one another. The delay networks 211 and 213 may be adjusted for compensating said shift. They have the further effect of causing the simultaneous emission of the two sequences at a suitable time; the operations of the device of the invention are cyclic, each cycle corresponding to the time which separates two successive controlling pulses. Each controlling pulse triggers the sampling of an instantaneous amplitude of the intelligence wave to be translated, and the sample is stored during a predetermined duration which cannot exceed the duration of one cycle. The sequences must be generated during this duration. Since the saw-toothed wave is triggered by the controlling pulses, it is necessary to use the sequences generated by the tube during the previous cycle: the delay of the delay networks 211 and 213 is adjusted in consequence.

Figure 3 shows diagrammatically a type of embodiment of the sampling and storing devices referenced 104 and 105 in Figure 1. It comprises two electronic tubes 301 and 302 which are locked by a bias voltage applied to their grid circuit, the tube 301 is locked by a negative bias voltage and the tube 302 by the charge voltage of a condenser 303 connected between its cathode and a constant potential point called a "ground." They are unlocked during a very short instant once during each period T, by each controlling pulse arriving through 304. The condenser 303 is initially charged to a predetermined voltage by the anode voltage applied to the tubes. Upon the tubes being unlocked, this charge voltage drops suddenly and takes a value which depends on the instantaneous voltage, at that time, of the wave applied by 305 to the grid of the first tube. When the two tubes are again locked, after the controlling pulse has disappeared, the condenser 303 stores the new voltage value until the unlocking by the next pulse and consequently effects the storing of the sampled voltage. 306 and 307 are two electronic amplifier tubes which transmit, while amplifying them, to a circuit 308, the stepped variations of the charge voltage of the condenser 303 without discharging the latter in an appreciable manner.

Figure 4:
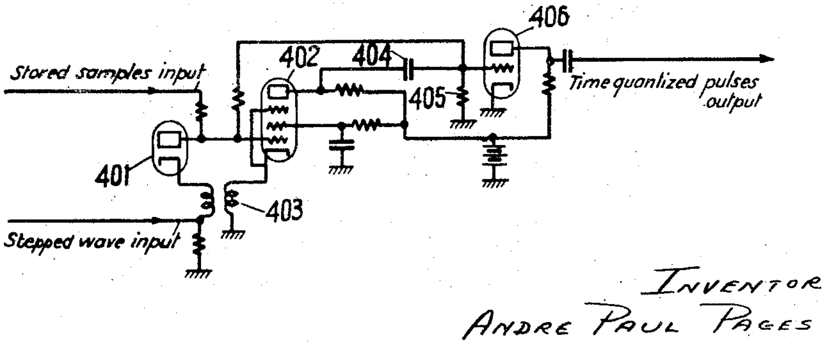

Figure 4 shows a mode of embodiment of the voltage comparator referenced 106 on Figure 1. It comprises essentially a "blocking oscillator" of a known type controlled through a diode by the two voltages to be compared.

The stored wave is applied to the anode of the diode tube 401. The stepped wave is applied to its cathode. During one of the jumps of the stepped wave, the voltage applied to the cathode of the tube 401 becomes smaller than the constant voltage applied to the anode and the diode tube suddenly becomes conducting. The tube 402 is locked by the violent reaction produced through the coupling transformer 403 between the anode and grid circuits. The anode current of the tube decreases and the anode voltage suddenly increases. This voltage variation excites a time differentiation circuit comprising a condenser 404 and a resistance 405, which generates a short pulse which is applied to the tube 406 at the output of which a short amplified pulse is obtained. This pulse, which is shown on Figure *6e*, and which, except for the operating time of the device described (a time which may be compensated by a slight increase in the delay of the delay network 213) coincides with one pulse in the coded sequence; the rank of the pulse selected in the sequence depends on the sampled amplitude of the intelligence wave to be transmitted.

Figure 5:
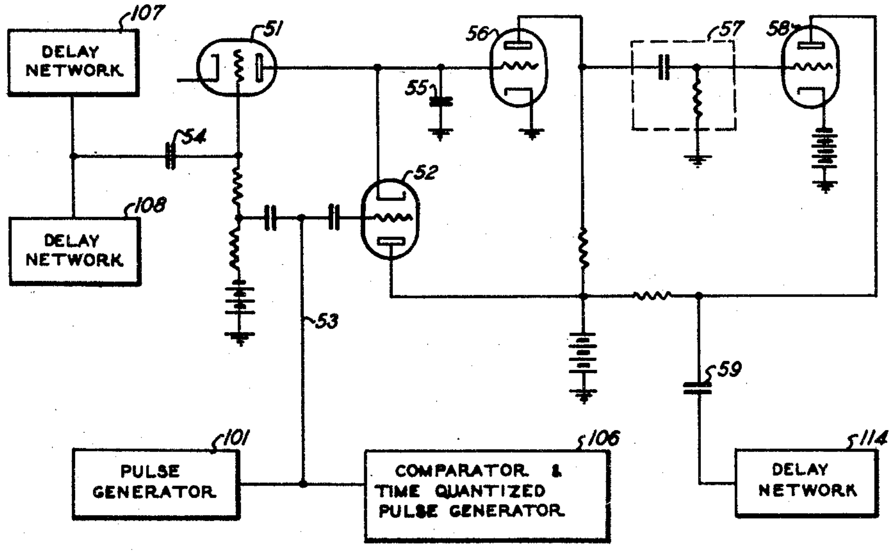

Figure 5 represents a mode of embodiment of the devices 110, 111, 112 in Figure 1, designated as "gates" in the above description. The principle of operation of this device is similar to the one shown in Figure 3 and described above. 501 and 502 are two tubes which are initially blocked and which become active only during the short instants in which a pulse is applied simultaneously to their grids by 503. This connection 503 is connected, on the one hand with the pulse generator 101 in Figure 1, and on the other hand with the voltage comparator 106 in the same figure. It has been assumed that Figure 5 represented, for instance, the gate 111 in Figure 1; the grid of tube 501 also is connected at 504 to the connecting point of elements 107 and 108 of the delay chain 107, 108, 109 in Figure 1. 505 is a condenser placed in the anode circuit of the tube 501 and in parallel with the anode-cathode space of the tube 502. 506 is a conventional amplifier tube, 507 a time-differentiating network consisting, in the usual manner, of a condenser and a resistance, 508 is an amplifier tube, initially locked by a negative direct voltage applied to its grid. The output 509 of the device is connected with the delay network 114 in Figure 1.

This device operates as follows: the tubes 501 and 502 are unlocked twice every period T, first by a pulse supplied by the pulse generator 101, then by a quantized pulse generated, as explained above, by the comparator 106, at a variable instant, but quantized, in the period T. At the time the first one of these pulses is generated, which happens between the sending of two sequences of coded pulses, the voltage at 504 is zero; the condenser 505, therefore, charges to a well defined voltage. Upon the sending of the second one of these pulses, two cases are possible; the voltage at 504 is still zero if the pulse the peak of which passes through 504 at that instant is "absent" and in such a case the voltage of the terminals of the condenser 505 does not change; this peak voltage, on the contrary, has a positive value different from zero, if said pulse is "present"; the charging voltage of the condenser then changes suddenly to take a smaller value. This sudden voltage lowering at the terminals of 505 is transmitted through the amplifier tube 506 to the differentiating network 507 which transmits to the grid of the tube 508 a positive voltage pulse. This pulse unlocks the tube and a pulse is transmitted, therefore, through 509 to the delay network 119. Thus, as desired, no pulse is transmitted to 119 if the pulse passing in the delaying chain at the time of the quantized intermediate pulse was of an "absent" nature and a pulse is transmitted if it was of a "present" condition. There remains to be shown that, upon the unlocking of the tubes 501 and 502 by a pulse from the generator 101, occurring after the transmission of a code pulse by the device, said device transmits no untimely pulse. The sudden voltage increase at the terminals of condenser 505 resuming its initial value causes, in the differentiating network 507 a pulse, but that pulse, being negative in sign, does not unlock the tube 508 and consequently is not transmitted by said tube.

Figure 6:
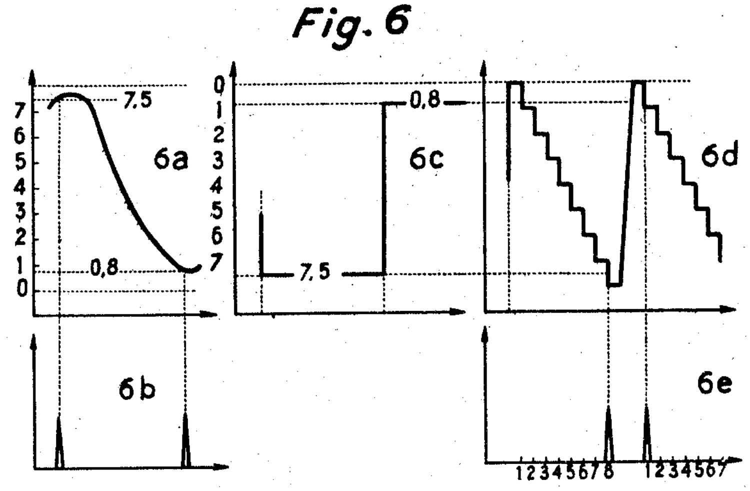

Figure 6 will now be considered and the manner in which the device which is an object of the invention works will be explained.

There is shown, at *6a*, a portion of the intelligence wave to be transmitted, during which two controlling pulses shown at *6b* are emitted. In accordance with the three-digit code chosen by way of example, the variation range of the wave amplitude has been divided into 8 intervals. At the time of the first controlling pulse, the instantaneous amplitude of the wave has, for instance, a value 7.5 (the scale for this value as for the following ones being arbitrary) and is therefore in the 8th interval. At the time of the next controlling pulse, the instantaneous amplitude of the wave has a value 0.8 and is therefore in the first interval.

At the output from the first sampler and storer 104, two voltage constant values are obtained, the values of which, except for a proportionality factor which has not been taken into account on the figure, are respectively equal to 7.5 and 0.8, as shown in *6c*. These values are measured from the value corresponding to a zero amplitude: the figure assumes, by way of example, that the voltage of the stored wave decreases when the initial amplitude increases, as is the case if a sampler-storer according to the diagram of Figure 3 is used.

The sampler storer 105 is actuated by the saw-tooth wave generated by 102 and synchronized with 101 and triggered by the 8 pulses of the non-coded pulse sequence supplied by 103. The stepped wave collected at the output from 105 thus decreases eight times during the time interval separating two controlling pulses, as shown in *6d*.

The operation of the comparator and generator of time quantized pulses 106 is illustrated at *6d* and *6e*. The comparator operates when the voltage of the wave *6d* becomes, as in the case of the example chosen, smaller than that of the wave *6c* and its operation causes the emission of one pulse; the pulses emitted, shown at *6e*, will thus be respectively the eighth and first ones.

During the above operations, the pulses of the coded sequence are propagated through the delay networks 107 and 108. The relative phases of the two sequences have been adjusted in 103 in such a manner that at the time when the first time quantized pulse is emitted; the middle of the first pulse of the coded sequence is at the point *a* and consequently that of the second one at *b* and that of the third one at *c*. At the time when another time quantized pulse is emitted, another group of three coded pulses is at points *a, b* and *c*. If it is the 8th quantized pulse which is actually emitted, at points *a, b, c* is the 8th group which comprises the 8th coded pulse (the 9th being identical with the first one and the tenth being identical with the second one).

If the coded sequence is, as assumed above, represented by 0 1 0 0 0 1 1 1 0 1 . . . the first group is represented by 010 and the eighth one by 101.

When the eighth time quantized pulse is emitted by 106 the gates 110, 111, and 112 transfer to the delay networks 113, 114 and 115 the pulses of the eighth group, i. e. a "present" pulse, an "absent" pulse and "a present" pulse. These networks stagger them in time, the eighth group is then constituted and after re-shaping in 116 is applied to the transmission medium, of whatever type the latter may be.

Similarly, when, during the next cycle, the first time quantized pulse would be emitted, the first group constituted by an "absent" pulse followed by a "present" pulse and an "absent" pulse would be formed in the same manner.

I claim:

1. In a telecommunication system wherein an intelligence wave to be transmitted is sampled for its instantaneous amplitude at periodically recurring instants with a time period T and in which each sampled amplitude is represented by a group of an integer number $n$ of coded electric pulses, each of which may be two possible signalling conditions $2^n$ possible different amplitudes being respectively represented by the $2^n$ possible different permutation groups of $n$ electric pulses of one or of the other of said signalling conditions, a coding device comprising a main generator of periodic pulses of period T, electron tube means controlled by pulses from said generator whereby a non-coded sequence and a coded sequence of voltage pulses are produced, a storer and sampler device controlled by said periodic pulses from said generator for periodically sampling the said intelligence wave and storing the value of its sampled instantaneous amplitude in the form of an electric voltage, a stepped-wave generator controlled by the pulses of the said non-coded sequence and supplying a stepped-save whose successive voltage levels are in number $2^n$ and reproduce the $2^n$ different amplitudes of the said intelligence wave to be represented, a voltage comparator for comparing the level of the said stepped wave to said stored amplitude of the said intelligence wave and a control pulse generator controlled by the said comparator allowing a control pulse to be generated when the amplitude of the said stepped wave equals the value of the said stored amplitude of the said intelligence wave, a chain of delay networks provided with $n$ connection points to the input end of which the above said sequence of coded pulses is applied and to the output end of which a non-reflective terminal impedance is connected, and $n$ gate devices controlled by the said control pulse for causing the $n$ values of the $n$ voltages present at the said $n$ points to be transferred as $n$ voltage pulses to a common utilization circuit.

2. A device as claimed in claim 1 wherein said voltage comparator comprises a blocked oscillator, the oscillating of which is controlled once every period T by said sampled and stored voltage from said wave to be transmitted, said stored voltage remaining constant during a part at least of said period T, and by voltage from said stepped-wave generator, said voltages being applied to a circuit comprising a diode being initially non-conducting, conducting when the voltage value of one step of said stepped-wave voltage equals the value of said stored voltage.

3. A device as claimed in claim 1 comprising a sawtooth wave generator and wherein said stepped-wave voltage generator comprises a sampling and storing device operated, during each period T by said non-coded sequence of pulses and successively storing for a duration equal to that of one step of said stepped-wave, each one of $2^n$ voltages having successive values in arithmetical progression sampled on the increasing linear branch of a sawtooth voltage generated by said sawtooth wave generator controlled by said main pulse generator.

References Cited in the file of this patent

UNITED STATES PATENTS

| | | |
|---|---|---|
| 2,521,733 | Lesti | Sept. 12, 1950 |
| 2,549,422 | Carbrey | Apr. 17, 1951 |
| 2,592,308 | Meacham | Apr. 8, 1952 |

FOREIGN PATENTS

| | | |
|---|---|---|
| 505,653 | Great Britain | May 1, 1939 |

OTHER REFERENCES

"Electrical Communication," September 1947, pp. 287–296.

Bell Telephone System Technical Publications, Monograph B–140, pp. 6 to 13.